(12) United States Patent
Bianchi et al.

(10) Patent No.: US 11,953,271 B2
(45) Date of Patent: Apr. 9, 2024

(54) THERMAL ENERGY STORAGE APPARATUS

(71) Applicant: ENI S.P.A., Rome (IT)

(72) Inventors: Gabriele Bianchi, Novara (IT); Carla Lazzari, Novara (IT); Carmen Sama', Novara (IT); Tamara Passera, Novara (IT)

(73) Assignee: ENI S.P.A., Rome (IT)

( * ) Notice: Subject to any disclaimer, the term of this patent is extended or adjusted under 35 U.S.C. 154(b) by 222 days.

(21) Appl. No.: 17/419,023

(22) PCT Filed: Dec. 23, 2019

(86) PCT No.: PCT/IB2019/061297
§ 371 (c)(1),
(2) Date: Jun. 28, 2021

(87) PCT Pub. No.: WO2020/136558
PCT Pub. Date: Jul. 2, 2020

(65) Prior Publication Data
US 2022/0082336 A1    Mar. 17, 2022

(30) Foreign Application Priority Data

Dec. 27, 2018 (IT) .................. 102018000021106

(51) Int. Cl.
*F28D 17/00* (2006.01)
*F28D 20/02* (2006.01)
(52) U.S. Cl.
CPC .................. *F28D 20/02* (2013.01)

(58) Field of Classification Search
CPC ........................................ F28D 20/02
USPC ........................................ 165/10
See application file for complete search history.

(56) References Cited

FOREIGN PATENT DOCUMENTS

| CN | 101435668 A | * | 5/2009 |
|---|---|---|---|
| CN | 103591822 A | | 2/2014 |
| CN | 104520663 A | | 4/2015 |
| CN | 205825781 U | | 12/2016 |
| CN | 206440165 U | | 8/2017 |
| CN | 107270757 A | | 10/2017 |
| CN | 108362152 A | | 8/2018 |
| DE | 4236761 A1 | | 5/1993 |
| DE | 9301812 U1 | | 5/1993 |
| FR | 2529999 A1 | | 1/1984 |
| GB | 2261831 A | | 6/1993 |

OTHER PUBLICATIONS

CN Office Action dated Aug. 30, 2022, re: Application No. 201980085394.6, pp. 1-19, CN103591882A, CN205825781U, CN104520663A, CN206440165U, CN108362152A, CN107270757A, FR2529999A1, DE93018112U1, GB9222737D0.

(Continued)

*Primary Examiner* — Davis D Hwu
(74) *Attorney, Agent, or Firm* — CANTOR COLBURN LLP

(57) ABSTRACT

A thermal energy storage apparatus includes at least one hollow tube having an internal cavity and at least one basic module placed inside the internal cavity. The at least one basic module has at least one slab, at least one pair of spacer bars, and at least one through channel adapted for the passage of a heat transfer fluid.

22 Claims, 5 Drawing Sheets

(56) References Cited

OTHER PUBLICATIONS

International Preliminary Report on Patentability (IPRP) dated Feb. 26, 2021 re: Application No. PCT/IB2019/061297, pp. 1-22, citing: DE 42 36 761 A1, DE 93 01 812 U1, FR 2 529 999 A1.
International Search Report dated Feb. 27, 2020 re: Application No. PCT/IB2019/061297, pp. 1-3, citing: DE 42 36 761 A1, DE 93 01 812 U1 and FR 2 529 999 A1.
Written Opinion dated Feb. 27, 2020 re: Application No. PCT/IB2019/061297, pp. 1-3, citing: DE 42 36 761 A1, DE 93 01 812 U1 and FR 2 529 999 A1.

\* cited by examiner

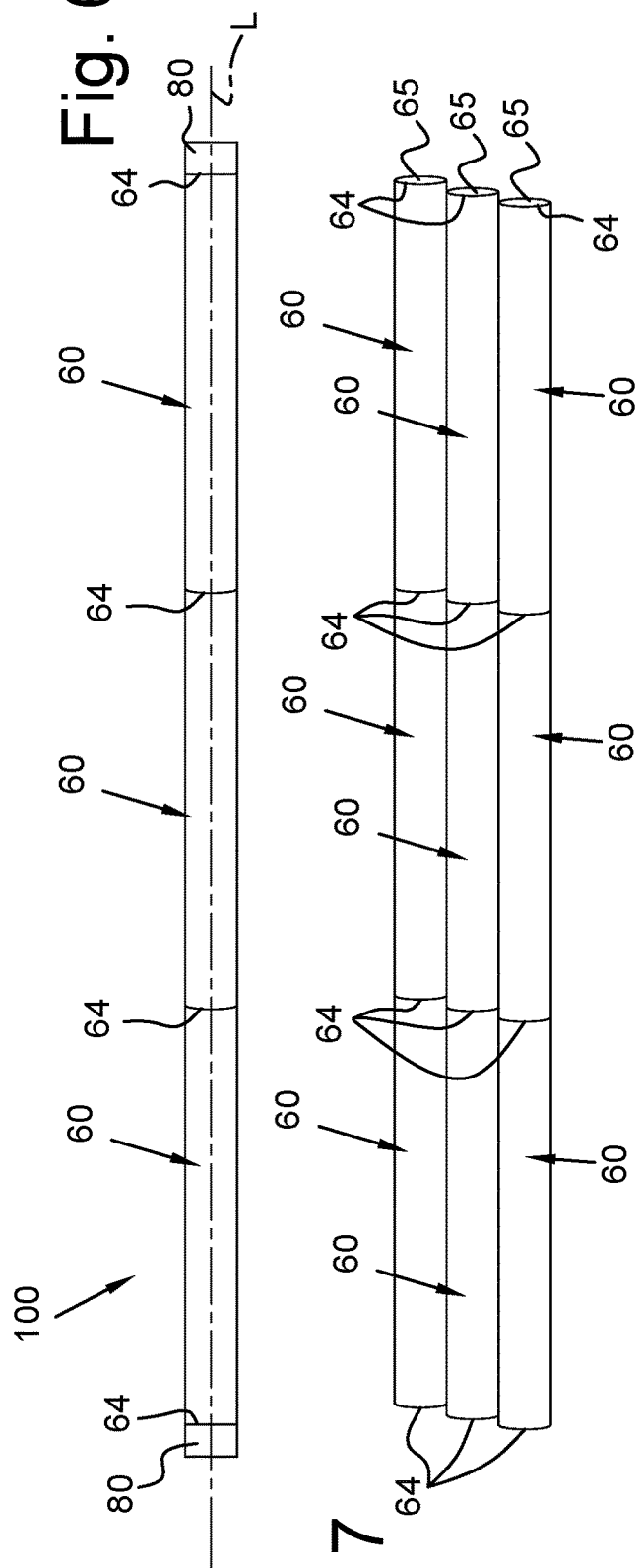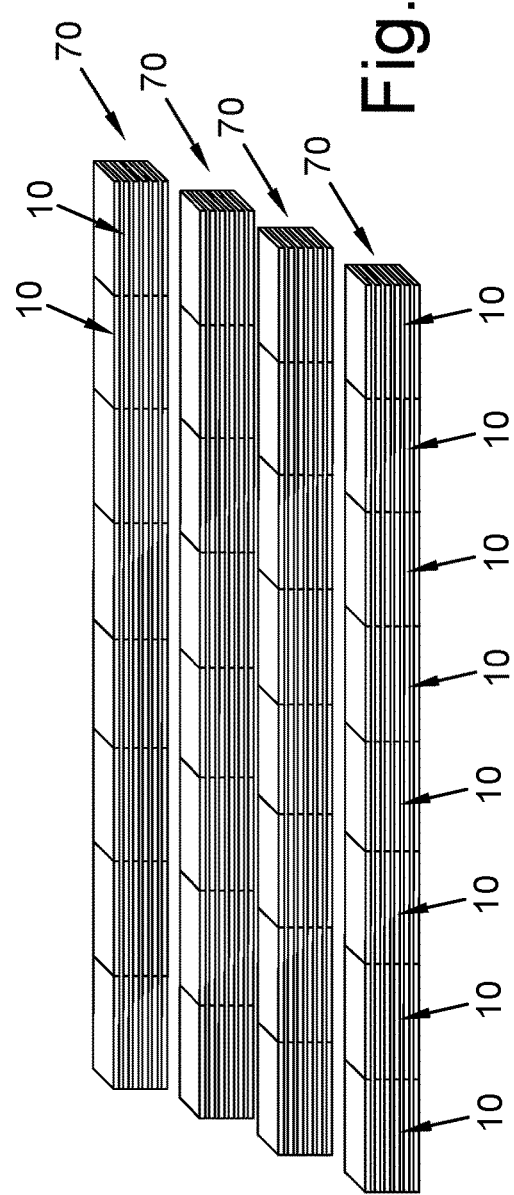

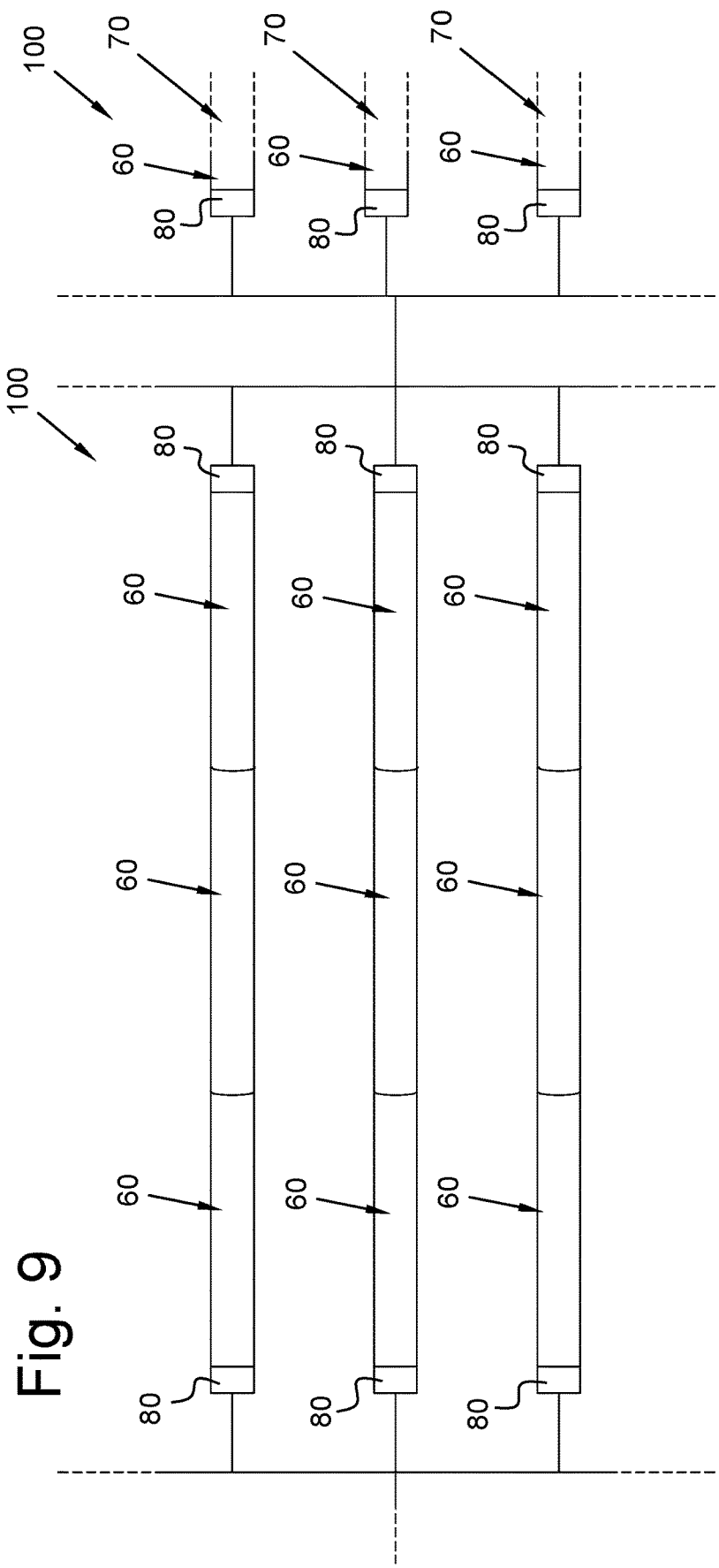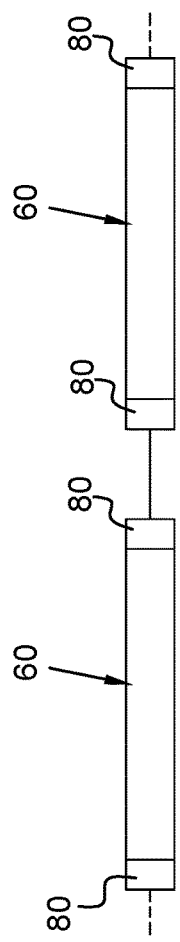

THERMAL ENERGY STORAGE APPARATUS

TECHNICAL FIELD

The present disclosure relates to a thermal energy storage apparatus.

BACKGROUND

In the prior art systems for storing thermal energy are known which are applicable to every situation of thermal generation or recovery. In particular, thermal storage is adapted to be applied in power generation systems by renewable sources, such as for example concentrated solar plants (CSP).

Renewable energy storage systems make it possible to store the excess energy produced during the day and return it when the insulation is low or non-existent and/or when the energy demand is greater. The storage of thermal energy advantageously balances the energy supply with the demand from users.

Thermal energy storage systems can be classified according to the method used for heat accumulation: "sensible heat storage" in which energy is stored in the form of sensible heat by varying the temperature between a minimum value and a maximum value of a storage medium, which can be both solid and liquid and which does not undergo changes in its physical state; "latent heat storage" in which energy is stored in the form of latent heat deriving from the passage of phase of a material, usually it is about transforming from liquid to solid and vice versa; "chemical heat storage" in which energy is stored by exploiting appropriate completely reversible chemical reactions, in the form of heat of chemical absorption or by producing $H_2$ or synthesis gas.

Except for the systems in which there is direct generation of steam and in which the fact of using a storage of the "latent heat storage" type could be advantageous, in other types of systems, as in most CSP plants, thermal energy is stored in the form of sensible heat "sensible heat storage". In addition to the operating conditions such as temperature and operating pressure of the plant, the fundamental parameters for this type of storage are related to the type of storage medium used: density, specific heat, thermal conductivity and diffusivity, steam pressure, compatibility with the materials used. To date, the most widely used technological solution involves the installation of two tanks with variable level, in which the liquid storage medium is stored at its minimum and maximum temperature. This technology can be defined as direct when the storage medium used is also the heat transfer fluid through which the heat is absorbed or transferred, or as indirect when the storage medium and the heat transfer fluid are two different substances and the storage is charged and/or discharged through a heat exchanger.

Technological research is moving towards a single tank. The thermal energy is accumulated by establishing a temperature gradient, the so-called thermocline, inside the storage medium, which allows to ideally segregate the area at the minimum temperature from the area at the maximum temperature, if properly controlled. Also for this technology it is possible to talk about direct or indirect storage as already described above. The reason for using a material as thermal accumulation is dictated by several factors: easy availability, low cost, possibility of reaching high temperatures, ease of production, absence of environmental problems.

In addition to the possibility of using liquids, it is possible to choose solid materials as storage mediums such as solid particles, for example sand, or concrete and/or ceramic material.

The first type allows performing both a direct and indirect storage, in the first case making the bed of solid particles fluid and also using it as a heat transfer fluid, in the second case hypothesizing a packed bed inside the storage and accumulating and/or releasing heat by direct contact with the heat transfer fluid. The possibility of using solid particles both as a heat transfer fluid and as a storage medium allows eliminating inefficiencies linked to the heat exchange between the two substances. The disadvantages of this choice, however, are numerous: the particles must have a well-defined diameter in order to be able to obtain a fluid bed, high consumption of air and/or gas used to fluidize the bed, dust formation due to the mechanical stress to which the particles are subjected, phenomena of abrasion on the material in contact with the fluid bed, possible formation of agglomerates at high temperature due to sintering phenomena. Some of these critical issues are overcome by adopting a packed and thus steady bed of particles. In this case the heat is accumulated and/or transferred by direct contact with the heat transfer fluid which must necessarily be chemically compatible with the material chosen as a storage medium. In doing so, there is no more energy waste to fluidize the bed, moreover, the particle diameter still needs to be controlled, but not as tightly as to have a fluidized bed. The possibility of using solid particles maximizes the exchange area between the heat transfer fluid and the storage medium itself, but there are still some disadvantages, such as: the progressive inelastic deformation (thermal ratcheting) to which the packed bed is subjected due to the repeated thermal cycles; the instauration of hot fluid channels within the colder fluid due to the different densities and viscosities, known as fingering or channelling.

Some technical solutions provide for the heat transfer fluid to flow not in contact with the concrete but in metal tubes surrounded by concrete. This embodiment may present the problem of spalling, i.e. the detachment of the concrete from the tube due to high overpressure that occurs inside the material itself due to evaporation of the present water or differences in thermal expansions.

Some technical solutions have a slab system in which the spaces between adjacent concrete slabs are very small (1-2 mm) that are obtained by placing thin sheets of sacrificial layers, for example of wax or plastic, in the mould which are not simple to place and which must then be removed. Given the large dimensions of the slabs (0.5-1.5 m wide, 2.5-5 m high by 10-30 mm thick) this solution features considerable difficulties and problems from an implementation point of view. Disadvantageously, once the wax sheets have been removed, the obtained through channels can be irregular and have a wavy shape.

The state of the known art provides for rectangular concrete slabs of equal size arranged in a parallelepiped-shaped container. This solution is suitable and economically viable for systems where the pressures involved are kept low, i.e. less than 5 or 10 bar. As the pressure increases, the thickness of the casing and/or external container with rectangular and/or square section, given the non-homogeneity of the thrust on the walls, increases very quickly, making the solution of the prior art disadvantageously not applicable.

DE 4236761 A1 discloses a thermal energy apparatus comprising at least one hollow tube comprising an inner cavity and two ends, wherein each end provides a through opening, at least one basic module placed inside said inner cavity of said at least one hollow tube, wherein said at least one basic module comprises at least one slab and at least one pair of spacer bars, at least one through channel which is not formed by the slabs and by said pair of spacer bars and which is adapted for the passage of the heat transfer fluid inside said inner cavity, disadvantageously without any well-defined through channels.

SUMMARY

The present disclosure provides a thermal energy storage apparatus which overcomes the disadvantages of the prior art.

According to the disclosure this is achieved by providing a thermal energy storage apparatus according to claim 1.

The present disclosure also provides a method for manufacturing a thermal energy storage apparatus which overcomes the disadvantages of the known art.

According to the disclosure, a process for manufacturing a thermal energy storage apparatus is provided according to claim 22.

Other features are comprised in the dependent claims.

BRIEF DESCRIPTION OF THE DRAWINGS

The features and advantages of the present disclosure will result more apparent from the following description, which is to be understood as exemplifying and not limiting, with reference to the appended schematic drawings, wherein:

FIG. 6 is a side view of hollow tubes comprising respective cavities inside which basic modules of the energy storage apparatus are arranged which are mutually arranged in series so that the hollow channels are in flow communication with each other, where three hollow tubes are arranged in series in such a way that their cavities are arranged in flow communication between them and flow distributors connected to a hydraulic network for a heat transfer fluid are provided for at the ends of the tubes;

FIG. 7 is an axonometric view of three hollow tubes mutually arranged in series to form three series of three hollow tubes, where the three series of three hollow tubes are in turn mutually arranged in parallel;

FIG. 8 shows an axonometric view of a multiplicity of basic modules arranged in series so that the hollow channels are in flow communication with each other, where the multiplicity of basic modules arranged in series is in turn arranged in parallel;

FIG. 9 is a schematic view of a configuration of hydraulic connection of a multiplicity of series of hollow tubes comprising a multiplicity of basic modules inside their cavities, where the multiplicity of series of hollow tubes are mutually connected in parallel by means of heat transfer fluid distributors which are arranged at the ends of each series of hollow tubes, where the multiplicity of series of hollow tubes in parallel is connected with another multiplicity of hollow tubes by means of the hydraulic network and the heat transfer fluid distributors;

FIG. 10 is a schematic view of an alternative configuration of two hollow tubes comprising heat transfer fluid distributors at each end connected by means of the hydraulic network of the heat transfer fluid;

DETAILED DESCRIPTION OF THE DRAWINGS

Figure 2:
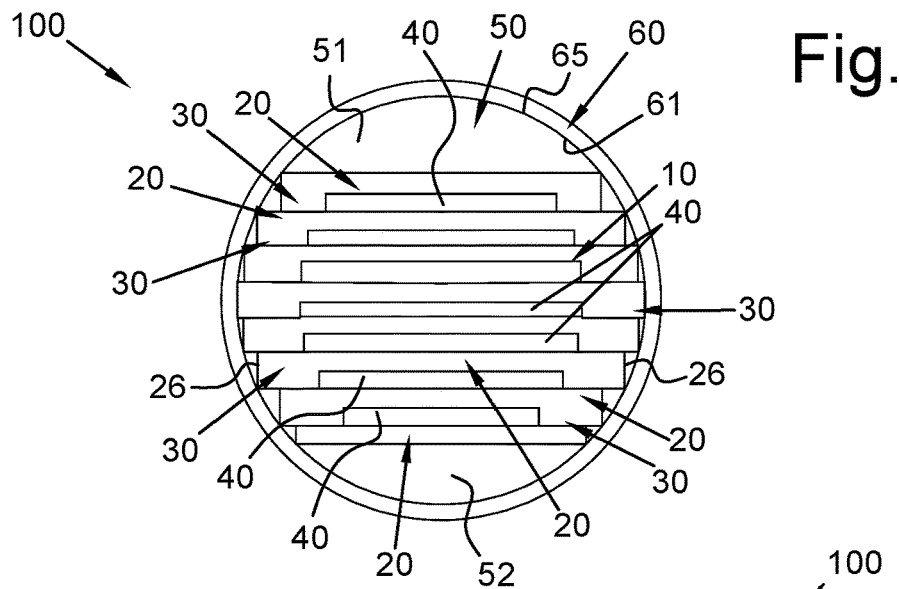
FIG. 2 is a front view of a cross-section of an energy storage apparatus comprising a hollow tube having a circular cross-section comprising a cavity with circular cross-section within which a basic module is arranged comprising stacked up elements comprising slabs with different transverse dimensions so as to follow a curvilinear profile of an inner wall of the cavity, where the basic module comprises a multiplicity of elements stacked up one on the other so that concrete slabs are stacked up one on the other and spaced apart by a multiplicity of pairs of spacer bars adapted to form a multiplicity of hollow channels adapted for the passage of a heat transfer fluid, where each hollow channel is comprised between the upper face of a stacked up lower slab, the pair of spacer bars and the lower face of a stacked up upper slab, where a lower slab at the base of the basic module does not comprise spacer bars, where said hollow channels have different dimensions, where upper and lower interstices of the cavity are respectively filled with concrete rods having a circular segment shape cross-section.
Figure 4:
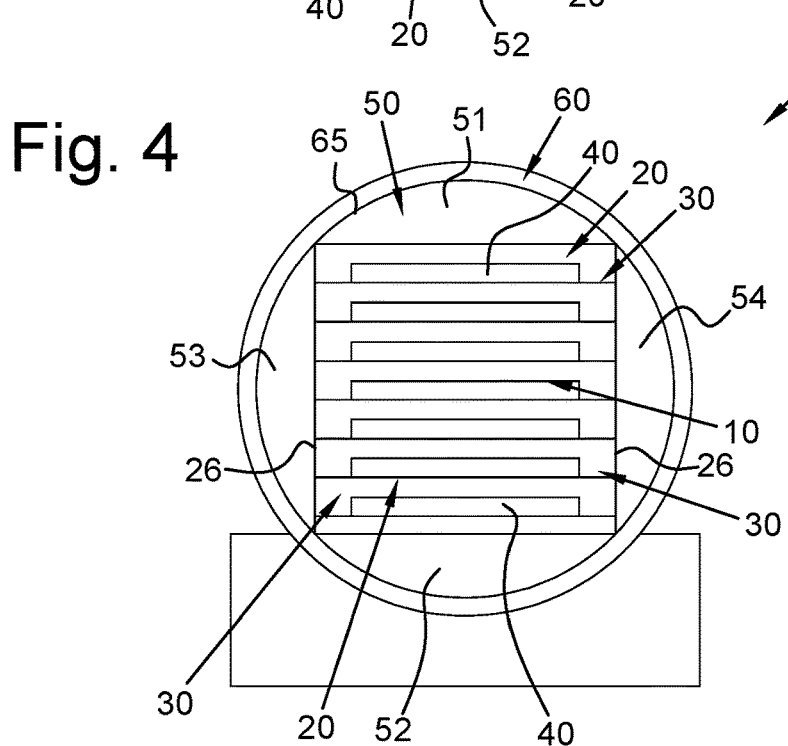
FIG. 4 is a front view of a cross-section of the energy storage apparatus comprising the hollow tube having a circular cross-section comprising the cavity of circular cross-section within which an alternative basic module shown in FIG. 3 is arranged comprising elements of the basic module comprising slabs of equal transverse dimensions, where upper, lower and lateral interstices of the cavity are respectively filled with concrete rods having a circular segment shape cross-section.
Figure 12:
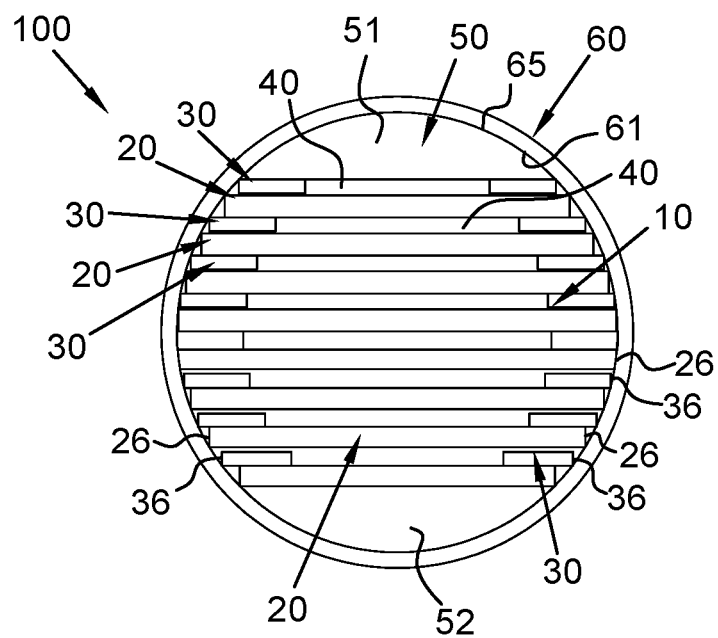
FIG. 12 is a front view of a cross-section of the energy storage apparatus comprising the hollow tube having a circular cross-section comprising the cavity having a circular cross-section inside which an alternative basic module is arranged comprising slabs separably mounted with pairs of bars, where the slabs have different transverse dimensions so as to follow the curvilinear profile of the inner wall of the cavity, where the pairs of spacer bars comprise an outer wall which comprises at least one portion in contact with the curvilinear profile of the inner wall of the cavity, where upper and lower interstices of the cavity are respectively filled with concrete rods having a circular segment shape cross-section.

With reference to the aforementioned Figures and in particular to FIGS. 2, 4 and 12, a thermal energy storage apparatus 100 is shown comprising a hollow tube 60 having a circular cross-section comprising an internal cavity 65 having a circular cross-section.

As shown in particular in FIG. 6, each hollow tube 60 comprises two ends, and each end comprises a through opening 64.

As shown for example in FIG. 6, the hollow tube 60 defines a longitudinal direction along which it extends from one end to the other.

As shown in particular in FIG. 8, the thermal energy storage apparatus 100 comprises a multiplicity of basic modules 10 arranged according to a configuration in series or a configuration in parallel inside said internal cavity 65 of said at least one hollow tube 60.

As shown in particular in FIG. 2, each basic module 10 of the thermal energy storage apparatus 100 comprises a multiplicity of elements 20, 30 stacked up one on the other.

Figure 1:
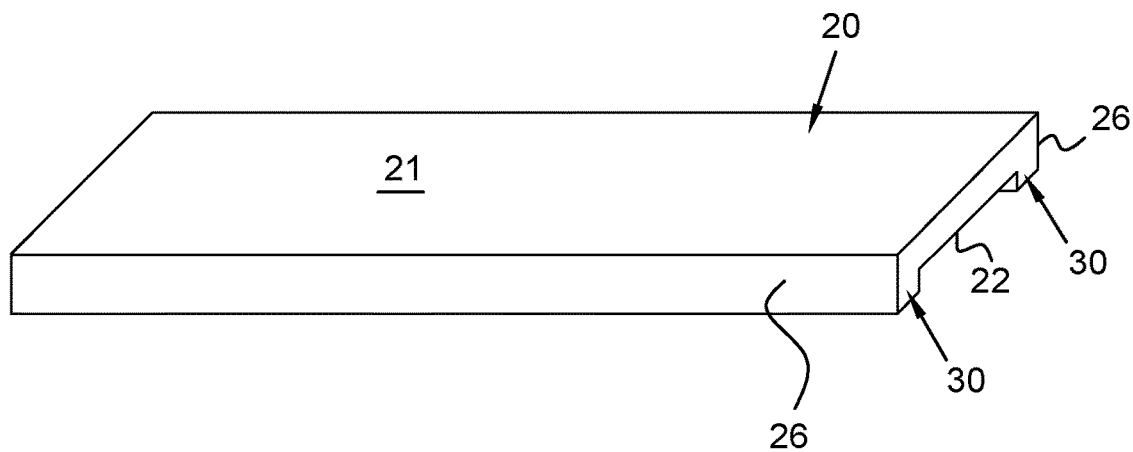
FIG. 1 is an axonometric view of an element of a basic module of a thermal energy storage apparatus according to the present disclosure, where the element of the basic module comprises a concrete slab and a pair of concrete spacer bars arranged parallel to each other and at two transverse edges of the slab, where the pair of spacer bars support the slab being arranged under the lower face of the slab, where the pair of spacer bars are one piece with the slab.

As shown in FIG. 1, each element 20, 30 of said basic module 10 comprises a slab 20 and a pair of spacer bars 30.

As shown in FIGS. 1-4, the slabs 20 and the pairs of spacer bars 30 are one piece.

The basic module 10 comprises a multiplicity of slabs 20 which are stacked up one on the other and a multiplicity of pairs of spacer bars 30 which space apart the stacked up slabs 20 between which the pair of spacer bars 30 is arranged.

FIG. 2 shows seven elements 20, 30, in particular eight slabs 20 are shown separated along a vertical direction by seven couples of spacer bars 30.

As it is evident from FIG. 1, at least one slab 20 of the basic module 10 has a transverse dimension as long as a transverse dimension of the cavity 65. The other slabs 20 of the basic module 10 have different dimensions in order to follow the curvilinear shape of an inner wall 61 of the cavity 65 of the hollow tube 60.

In FIGS. 2-5, 12 the basic module 10 comprises a multiplicity of couples of slabs 20 and a respective multiplicity of pairs of spacer bars 30.

As shown in particular in FIGS. 2-5, 12, each pair of spacer bars 30 is arranged between each couple of stacked up slabs 20 and is adapted to form a through channel 40 adapted for the passage of a heat transfer fluid from one end to the other of the two ends of the hollow tube 60.

Each through channel 40 is comprised between inner walls of each pair of spacer bars 30 and inner walls of each couple of stacked up slabs 20.

FIG. 2 shows seven through channels 40 of different transverse dimensions and equal height.

The thermal energy storage apparatus 100 provides for the use of concrete slabs 20 with spacer bars 30 having a rectangular cross-section whose height establishes the distance between the slabs 20 and the dimension of the respective through channel 40 in a vertical direction in a precise and correct manner.

The non-regularity of the channels highlighted in the state of the known art is thus solved in an advantageously simple manner.

Advantageously, the through channels 40 are easier to be made than in the state of the art and high efficiencies can be maintained since it is possible to guarantee the control of the height of the through channels 40 and a constant distance between the slabs 20. It is also possible to decide to change the height of the spacer bars 30 in a controlled manner, so as to dimension the cable channels 40 with extreme precision.

Figure 3:
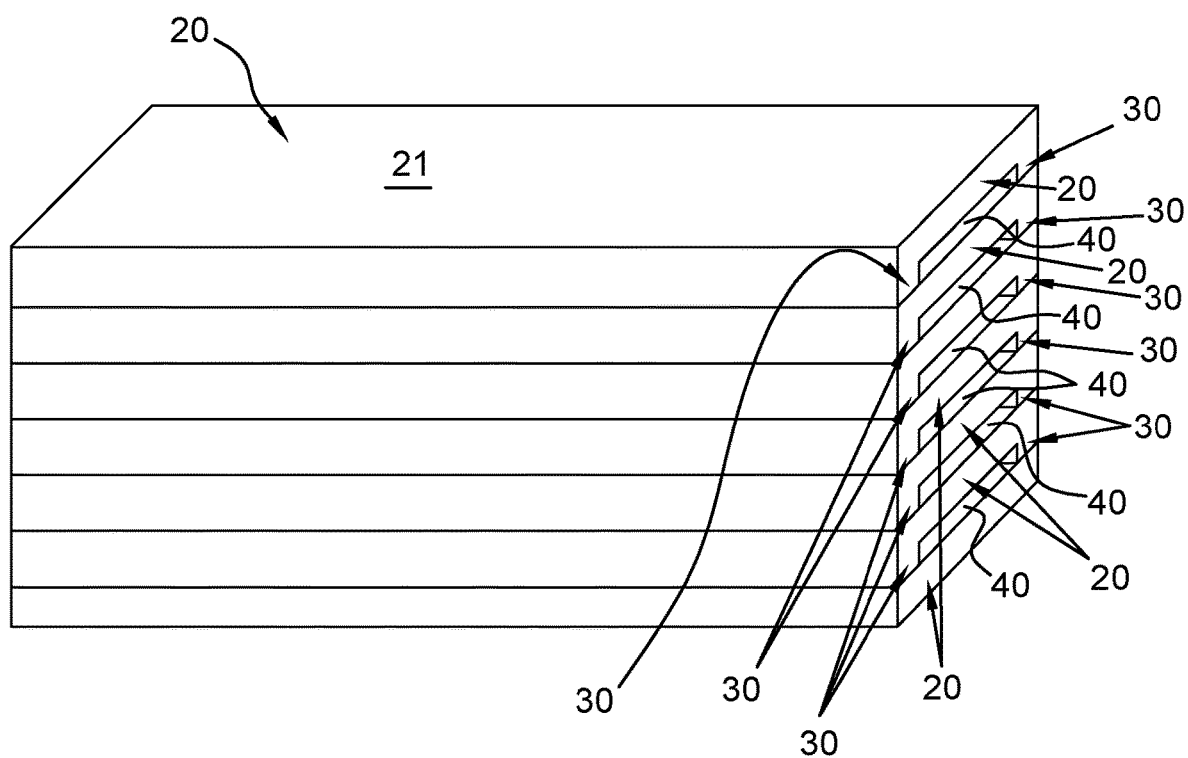
FIG. 3 is an axonometric view of an alternative basic module of the thermal energy storage apparatus comprising a multiplicity of elements stacked up one on the other so that concrete slabs, all with the same transverse dimensions, are stacked up one on the other and spaced apart by the multiplicity of pairs of spacer bars adapted to form a multiplicity of hollow channels, all with the same dimensions, adapted for the passage of the heat transfer fluid, where a lower slab at the base of the basic module does not comprise spacer bars.
Figure 5:
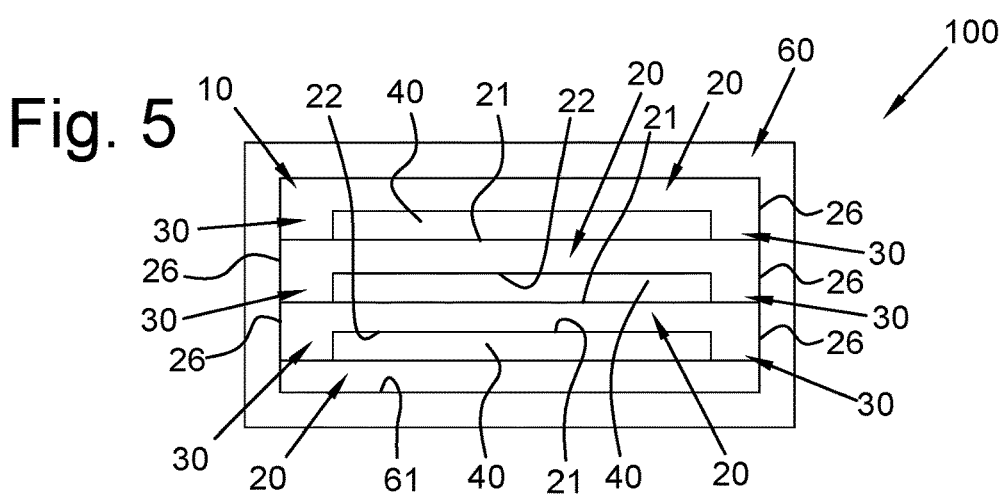
FIG. 5 is a front view of a cross-section of an alternative energy storage apparatus comprising an alternative hollow tube having a rectangular cross-section comprising a cavity with a rectangular cross-section inside which the alternative basic module of FIG. 3 is arranged comprising slabs of the same dimensions and pairs of spacer bars having a rectangular cross-section.

These couples of slabs 20 with pairs of spacer bars 30 advantageously make the stacking step of the slabs 20 modular, easy, fast, allowing a thermal energy storage apparatus 100 to be made comprising basic modules 10 adapted to follow the profile of the inner wall 61 of the cavity 65 of the hollow tube 60 as shown in FIGS. 2, 12 or basic modules 10 in the shape of a parallelepiped as shown in FIGS. 3, 4, 5.

Each slab 20 is made of concrete and each spacer bar 30 is made of concrete.

In particular, the slabs 20 are preferably made of concrete comprising high-performance aggregates which combine the characteristics of concrete with greater mechanical resistance to thermal shocks and an increase in chemical-physical properties such as specific heat, thermal conductivity while maintaining the cost low and making the thermal energy storage apparatus 100 economically advantageous.

The concrete slabs 20 can be stacked up directly on site inside the cavity 65 of the hollow metal tube 60.

The presence of the spacer bars 30 in one piece with the slab 20 contributes advantageously to the structural resistance of the basic module 10. Furthermore, advantageously, the slab 20 is advantageously more easily transportable and manageable.

Each spacer bar 30 of a pair of spacer bars 30 is arranged parallel to each other and parallel to a longitudinal axis L which passes along a longitudinal direction of the hollow tube 60.

Each spacer bar 30 of the basic module 10 comprises a rectangular cross-section.

Each spacer bar 30 of each pair of spacer bars 30 comprises a longitudinal dimension as long as a longitudinal dimension of the respective couple of stacked up slabs 20 between which the pair of spacer bars 30 is arranged.

Each slab 20 of the couple of stacked up slabs 20 comprises two faces: an upper face 21 and a lower face 22. Each pair of spacer bars 30 is arranged between the upper face 21 of a lower stacked up slab 20 and the lower face 22 of an upper stacked up slab 20 of the couple of stacked up slab 20.

Each slab 20 comprises two transverse edges 26.

Each spacer bar 30 comprises an outer transverse edge 36.

As shown in particular in FIGS. 1-5, 11, 12, each spacer bar 30 of the pair of spacer bars 30 is arranged at one of the two transverse edges 26 of the slab 20 so that the through channel 40 comprises a transverse dimension as long as the maximum transverse dimension comprised between the inner walls of the pair of spacer bars 30 and inner walls of the couple of stacked up slabs 20.

As shown in particular in FIGS. 6, 9, 10, at the mouth of the terminal through openings 64 of a multiplicity of hollow tubes 60 mutually arranged in series, heat transfer fluid distributors 80 connected to a system or to a hydraulic network are provided for the distribution of the heat transfer fluid.

Each slab 20 comprises a longitudinal dimension of length ranging between 0.5 and 20 meters, a transverse dimension of length ranging between 0.5 and 5 meters and a thickness of length ranging between 0.01 and 0.30 meters, wherein the thickness is measured along a vertical direction.

Preferably the single concrete slab can have a length interval from 1 to 20 m; width from 0.7 to 3 m and height from 2 to 10 cm.

The height of the slab 20 and the thickness between two slabs 20 constituting the through channel 40 of the heat transfer fluid are parameters of fundamental importance in the dimensioning of the efficient thermal storage apparatus 100 and their value is determined with suitable simulations which take into consideration the chemical-physical characteristics of the solid material and of the heat transfer fluid used as well as the operating conditions used in the storage system. In this solution both these parameters are easily controllable and achievable.

The spacer bar 30 comprises a thickness ranging between 0.5 and 5 centimetres in length, where the thickness is measured along the vertical direction, defining a vertical dimension of the through channel 40.

The spacer bar 30 comprises a transverse dimension having a length ranging between 1 and 30 centimetres.

Preferably the length of the spacer bars 30 is equal to that of the slab 20; the height of the spacer bars 30 is equal to the desired thickness between two slabs 20, as well as the dimensions of the through channels 40, in a range between 1 and 4 cm; the width of the spacer bars 30 varies in a range between 5 and 20 cm.

The proposed dimensions represent an easily achievable solution and therefore allow advantageously to simplify the manufacturing step.

The thermal energy storage apparatus 100 has the advantage of providing a low-cost thermal energy storage system that can be used in all thermal applications that benefit from the management of such a heat in a separate manner from its production. Examples cover the use in combination with CSP solar systems, heat recovery systems such as power cycles in electricity generation, in reservoirs to increase the recovery factor, in solar desalination plants.

The thermal energy storage apparatus 100 comprises a hollow tube 60 having a circular cross-section.

The shape of the hollow tube 60 is the same shape as the inner walls 61 of the hollow tube 60 which form the internal cavity 65 of the hollow tube 60 and therefore also the cross-section of the cavity is of circular shape.

As shown in FIG. 2, each slab 20 of the couples of slabs 20 of the basic module 10 has transverse dimensions that are different from at least another slab 20 of the same couple of slabs 20 and/or of the same basic module 10 so that two transverse edges 26 of each slab 20 of the basic module 10 are in contact for at least one portion with curvilinear inner walls of the internal cavity 65 of the hollow tube 60. In this way, lateral semi-circular transverse empty spaces which would not be occupied if all the slabs 20 of the basic module 10 had the same transverse dimension, having a parallelepiped shape, are instead occupied by the basic module 10 itself deformed in a transverse direction. As a result, the through channels 40 have transverse dimensions that are different from one another.

As shown in FIG. 2, it is possible to completely fill the entire vertical dimension of the hollow tube 60, or as shown in FIG. 4, to provide for the two upper and lower empty spaces of the basic module 10 to be filled with concrete circular segment shaped rods 50, an upper rod 51 and a lower rod 52, so that the through channels 40 have transverse dimensions which vary within a given interval of lengths defined above in the embodiment of FIG. 2.

The rods 50 having a circular segment shape cross-section comprise a longitudinal dimension as long as the longitudinal dimension of the slabs 20 of the basic module 10 and/or as long as the longitudinal dimension of the cavity 65 of the hollow tube 60.

The rods 50 having a circular segment shape cross-section may be equivalent to the slabs 20, replacing one of the slabs 20 of the at least one couple of slabs 20 as shown in FIG. 4 in fact as regards the upper rod 51 which comprises a lower flat surface which is completely equivalent to the lower surface 22 of the slab 20, the upper rod 51 is superimposed directly on top of a pair of spacer bars 30 which separate it in vertical distance from the upper surface 21 of the lower slab 20.

Advantageously, the use of slabs 20 of different transverse width to allow these concrete slabs 20 to be stacked up with spacer bars 30 inside the cavity 65 of the cylindrical hollow tube 60 allows the use of commercially available cylindrical metal hollow tubes 60 obtaining a modular and expandable solution, adapted to work even with high pressures but based on standard and low-cost elements of the basic module 10.

Furthermore, as shown in FIG. 4, it is possible to provide for a further alternative where the thermal energy storage apparatus 100 of FIG. 3 comprises an alternative basic module 10 which partially fills the internal cavity 65 with an elliptical cross-section of the hollow tube 60. In this alternative shown in FIG. 4 it is possible to see that the parallelepiped-shaped basic module 10 shown in the embodiment of FIG. 3 is inserted or mounted directly inside the hollow tube 60 of circular section of FIG. 4. In this alternative there are four empty spaces left free by the basic module 10 and which in FIG. 4 are filled with as many four rods having a circular segment shape cross-section. 50, 51, 52, 53, 54, where the four rods 50 having a circular segment shape cross-section are made of concrete.

Advantageously the use of the semi-circular concrete rods 50 shown in the alternatives described above and in FIGS. 2 and 4, allows increasing the thermal insulation of the thermal energy storage apparatus 100 with the external environment.

Advantageously, thanks to the semi-circular concrete rods 50 it is possible to have a thermal insulation even when using hollow metal tubes 60 already on the market instead of hollow tubes 60 built directly of concrete.

In FIGS. 2 and 4 the slabs 20 can have variable or constant width in which the semi-circular empty spaces of the cavity 65 of the hollow tube 60 are filled with as many concrete rods comprising the circular segment shape cross-section.

Furthermore, it is provided for the possibility of concrete slabs 20 of variable dimension arranged in cavities 65 of the hollow tubes 60 or the possibility of slabs 20 of the same dimension stacked up in the cavity of the hollow tube 60 in which four empty spaces in the shape of circular segments with half-moon cross-section are created. By filling these four empty spaces with as many rods having cross-section in the shape of circular segments 50, the solution is advantageously suitable for systems with high temperatures as well as high pressures.

With these geometries of the thermal storage apparatus 100 shown in FIGS. 2 and 4, it is therefore possible to cover a wide pressure range and advantageously make the thermal energy storage apparatus 100 adapted to operate with a wide range of heat transfer fluids: various types of diathermic oil, mixtures of molten salts or gases with pressures for all fluids up to 100 bar.

Furthermore, the use of concrete rods 50 both as a further storage material and mainly as a thermal insulator from the external environment advantageously limits the necessary insulation on the outer wall of the hollow tube 60. There is therefore also an advantageous cost reduction.

Preferably the material of the rods 50 is different from that of the slabs 20 and in particular it can be concrete with low conductivity so that it can better work as thermal insulator. In this case its cost is even lower than that of the slabs 20.

As shown in particular in FIG. 4, a concrete base is positioned in the lower inner part of the cavity 65 of the hollow tube 60 which base is the rod having a circular segment shape section 52 above which several slabs 20 with variable dimensions are stacked up horizontally as in FIG. 2 or in a fixed dimension as in FIG. 4. The uppermost inner part of the cavity 65 of the hollow tube 60 is filled with a further concrete rod having circular segment shape cross-section 51. The hollow tube 60 of circular cross-section filled with the basic modules 10 and the rods 50 makes up the thermal energy storage apparatus 100.

Advantageously for the parallelepiped-shaped basic module 10 shown in FIG. 3 it is possible to use as a casing commercial hollow tubes 60 with a circular cross-section as shown in FIG. 4 and/or a rectangular cross-section as shown in FIG. 5 made of metal or concrete.

Advantageously, therefore, it is not necessary to design and manufacture particular casings, specifically developed for these basic modules 10. This further simplifies the implementation step and allows to advantageously contain the costs. It is sufficient to stack up the slabs 20 inside the cavity 65 of the hollow tube 60 and provide for the installation of the bottoms with the heat transfer fluid distributors 80 appropriately designed and manufactured to ensure a homogeneous distribution of the liquid between the various slabs 20 of the basic modules 10 of the thermal energy storage apparatus 100.

The thermal energy storage apparatus 100 comprises a single tank containing concrete slabs 20 stacked up in direct contact with a heat transfer fluid, as shown in FIGS. 2, 4, 5, 12. The slabs 20 are made with spacer bars 30 having a rectangular cross-section which make the stacking step simple.

The thermal energy storage apparatus 100 can have the shape of a parallelepiped with slabs 20 all of which have the same dimension as shown in FIG. 5.

The heat transfer fluid in direct contact with the concrete slabs 20 and the spacer bars 30 can be a stable fluid or gas with low viscosity at operating conditions, with good heat capacity and high heat transfer speed.

Examples of heat transfer fluids are diathermic oils or mixtures of molten salts, which are widely available on the market and can be used in the thermal storage system.

The temperature range of the storage system is from 0 to 700° C., the range of pressures from 1 to 100 bar.

The thermal transfer fluid is made to flow at the inlet to the storage system in the through channels 40 obtained by horizontally stacking up the concrete slabs 20 and the uniform distribution between the through channels 40 of the incoming fluid is obtained through a distributor 80. The speeds of the heat transfer fluid are kept low, in the range 0.0005 and 0.01 m/s. In the through channels 40 a laminar motion is established which favours the transfer of heat between the fluid and the concrete of the elements 20, 30 of the basic module 10.

As shown in FIGS. 6-8, the thermal energy storage apparatus 100 comprises a multiplicity of hollow tubes 60 and a multiplicity of basic modules 10, wherein each basic module 10 of said multiplicity of basic modules 10 is placed inside each internal cavity 65 of each hollow tube 60 of the multiplicity of hollow tubes 60.

Furthermore, as shown in particular in FIG. 6, each hollow tube 60 of this multiplicity of hollow tubes 60 is arranged in a configuration in series along the longitudinal axis L with another hollow tube 60 of the same multiplicity of hollow tubes 60 so that the ends of these two adjacent hollow tubes 60 arranged in series 70 are in flow communication with each other, having the through openings 64 in flow communication.

As shown in FIG. 10, it is also possible to provide for other forms of configuration in series, for example by providing that each hollow tube 60 comprises at its ends heat transfer fluid distributors 80 connected to the hydraulic network of the heat transfer fluid, in this way providing for connections both in series between the several hollow tubes 60 as shown in FIG. 10, and in parallel.

The internal cavity 65 of the hollow tube 60 can advantageously contain a multiplicity of basic modules 10 arranged in series 70 in such a way that the multiplicity of the through channels 40 of the adjacent basic modules 10 of this multiplicity of basic modules 10 arranged in series 70 is in flow communication with each other, or a series 70 of adjacent basic modules 10 and arranged in parallel inside the cavity 65 of a same hollow tube 60.

As shown in FIG. 9, connections between the series 70 of basic modules 10 contained in the hollow tubes 60 are possible, mutually arranging them both in parallel and in series by means of distributors 80 and the hydraulic network of the heat transfer fluid.

For thermal energy storage apparatuses 100 operating at low pressures, more identical slabs 20 stacked up horizontally form the basic module 10. Several basic modules 10 placed side by side in series 70 form a series 70 of basic modules 10 as shown for example in FIG. 8. At each end of the series 70 of basic modules 10 there is a distributor 80. The series 70 of basic modules 10 is contained in the hollow tube 60 having a rectangular cross-section, as shown for example in FIG. 5 or of circular cross-section as shown in FIGS. 2 and 4. Several series 70 of basic modules 10 configured in series and/or in parallel constitute the thermal energy storage apparatus 100 which is a thermal storage system.

The series 70 of basic modules 10 connected in parallel are connected in parallel by means of distributors 80 connected to the two respective through openings 64 of the ends of the hollow tubes 60 wherein each hollow tube 60 arranged in parallel comprises within its cavity 65 only one series 70 of basic modules 10 arranged in series 70.

Advantageously, the distance between adjacent through channels 40 is maintained between 1 and 4 cm and the slabs 20 have thicknesses between 2 and 10 cm, which represent dimensions that can be more easily controlled and obtained, advantageously reducing the manufacturing difficulties.

Despite these higher empty and full thicknesses, the performance and efficiency of the thermal energy storage apparatus 100 remain advantageously high with respect to the state of the art.

Moreover, the horizontal arrangement of the through channels 40 and their correct desired distance are obtained by using spacer bars 30 having a rectangular cross-section that advantageously allow a simpler and more regular stacking up of more concrete slabs 20 one on the other.

The control of the height of the through channels 40 as that of the slabs 20 are fundamental parameters for the efficiency of the storage and in this thermal energy storage apparatus 100 are obtained in a precise, repeatable, controllable and advantageously economic way, thanks to the use of special spacer bars 30.

The presence of spacer bars 30 advantageously also allows producing and stacking up single slabs 20 of 16 meters and with longer longitudinal dimension. From a fluid-dynamic point of view, moreover, within the single horizontal through channel 40 between horizontal slabs 20 the convective motions are limited with respect to vertical channels of vertical slabs of the state of the prior art, advantageously facilitating the formation of the thermocline and limiting the area.

Advantageously, the load losses per single series 70 of basic modules 10 and/or per the systems comprising several series 70 of basic modules 10 in series and/or parallel are lower and constant during the charging and discharging steps of the thermocline in which the direction of the flow inside the through channels 40 is reversed, guaranteeing a higher storage efficiency and an improvement in operations as a result. Advantageously, the through channels 40 are arranged horizontally. It is also possible to provide for the slabs 20 to be arranged vertically creating vertical channels but waiving the synergistic and advantageous technical effect of when the through channels 40 are arranged horizontally.

Advantageously, the thermal energy storage apparatus 100 provides for direct contact between heat transfer fluid and concrete without showing spalling problems even if molten salts are used and high temperatures are reached.

By way of example, two examples of the thermal energy storage apparatus 100 are given comprising the hollow tube 60 having a rectangular cross-section and the parallelepiped basic modules 10. For the two examples, basic modules 10 are used comprising slabs 20 and spacer bars 30 concrete solids and two possible heat transfer fluids comprising a mixture of molten salts and a diathermic oil with the following chemical-physical characteristics: the concrete solid has a density of 2300 kg/m³, with specific heat of 1000 J/kg/K and thermal conductivity of 1.2 W/m/K; Molten salts with density 1820 kg/m³, with specific heat of 1520 J/kg/K and thermal conductivity of 0.52 W/m/K; diathermic oil with a density of 770 kg/m³, with specific heat of 2425 J/kg/K and thermal conductivity of 0.089 W/m/K.

For the first example, a thermal energy of 500 kWh is stored, operating with a heat transfer fluid with molten salts in the temperature range comprised between 300 and 550 degrees Centigrade.

The thermal energy storage apparatus 100 comprises eight basic modules 10 arranged in series 70 to form a length along the direction of the longitudinal axis L of 16 linear meters. Each basic module 10 comprises slabs 20 of transverse dimension of 1 meter length, of longitudinal dimension of 2 meters. The basic module 10 as a whole has a height in the vertical direction of meters and is obtained by stacking up seven slabs with respective pairs of spacer bars 30 between a slab 20 and the other 20. The volume occupied by storage is equal to 8.67 m³, for a volume of concrete of 6.27 m³. The single through channels 40 have a height of 2.5 cm and the slabs 20 have a thickness of 5.6 cm with a vacuum degree of 0.31.

Once the thermal stability of the thermal energy storage apparatus 100 is reached, the charging and discharging time are both about 5 hours. The storage capacity is 80 kWh of heat for every cubic meter of concrete. The thermal energy storage apparatus 100 has an efficiency ranging between 94 and 97%.

For the second example, a thermal energy of 660 kWh is stored, operating with diathermic oil as a heat transfer fluid in the temperature range comprised between 300 and 400 degrees Centigrade.

The thermal energy storage apparatus 100 comprises two series 70 arranged in parallel of eight basic modules 10 arranged in series 70 to form a length along the longitudinal axis L of 16 linear meters. The two series 70 form two tanks. Each basic module 10 comprises slabs 20 of transverse dimension of 1 meter length, of longitudinal dimension of 2 meters. The basic module 10 as a whole has a height in the vertical direction of 0.55 meters and is obtained by stacking twenty-one slabs 20 with respective pairs of spacer bars 30 between a slab 20 and the other 20. The volume occupied by storage comprising the two series 70 is equal to 17.6 m³, for a concrete volume of 13.44 m³. The single through channels 40 have a height of 0.7 cm and the slabs 20 have a thickness of 2 cm with a vacuum degree of 0.25.

Once the thermal stability of the thermal energy storage apparatus 100 is reached, the charging and discharging time are both about 4.5 hours. The storage capacity is 50 kWh of heat for every cubic meter of concrete. The thermal energy storage apparatus 100 has an efficiency of 96%.

As far as the manufacture of this thermal energy storage apparatus 100 is concerned, it is possible to define a process which comprises a manufacturing step of the basic module 10.

The manufacturing step of the basic module 10 comprises a step of stacking up in order according to the vertical direction at least one first slab 20 of at least one couple of slabs 20, at least one pair of spacer bars 30 and at least one second slab 20 of the at least one couple of slabs 20 so that the first slab 20 and the second slab 20 are stacked up one on the other and are mutually spaced apart along a vertical direction by means of the pair of spacer bars 30 thus forming a through channel 40 adapted for the passage of a heat transfer fluid from one end to the other of two ends of the hollow tube 60, wherein each through channel 40 is comprised between inner walls of each pair of spacer bars 30 and inner walls of each couple of stacked up slabs 20.

This process for manufacturing the thermal energy storage apparatus 100 provides for the step of stacking up the elements 20, 30 of the basic module 10 to take place inside the cavity 65 of the tube 60 of the thermal energy storage apparatus 100.

Alternatively, this process for manufacturing the thermal energy storage apparatus 100 comprises a step of inserting the basic module 10 inside the internal cavity 65 of the hollow tube 60, wherein the hollow tube 60 comprises the internal cavity 65 and the two ends, where each end comprises the through opening 64.

Advantageously it is possible to stack up the slabs 20 one on the other by spacing them apart by means of pairs of spacer bars 30 also inside the cavity 65 of the hollow tube 60, making assembly easier.

Advantageously, it is also possible to provide for the basic module 10 to be assembled outside and to position it at a later time inside the cavity 65 of the hollow tube 60 to accelerate the manufacture of the thermal energy storage apparatus 100.

Alternatively, in order to obtain very large diameters of the internal cavity 65 of the hollow tube 60 it is possible for the slabs 20 with a smaller transverse dimension to be approached.

Advantageously, the basic module 10 being made up of several pieces, slabs 20 in one piece with the pair of spacer bars 30, does not show any problems of differential thermal expansion. It is therefore advantageously possible to manufacture a large-sized basic module 10.

Alternatively, the thermal energy storage apparatus 100 comprises at least one hollow tube 60 and at least one basic module 10 arranged inside the internal cavity 65 of the hollow tube 60.

Alternatively, the basic module 10 comprises a single couple of slabs 20 which are stacked up one on the other and a single pair of spacer bars 30 which space them apart one from the other along a vertical direction.

Alternatively, the basic module 10 provides that the element 20, 30 of the basic module 10 which comprises the slab 20 and the pair of spacer bars 30 rests on an inner wall 61 of the internal cavity 65 of the hollow tube 60 and provides that the through cavity 40 is comprised between the lower face 22 of the slab 20, the walls of the pair of spacer bars 30 and the inner wall 61 of the internal cavity 65 of the hollow tube 60.

Alternatively, it is also possible to provide for the opposite, that is when there is no slab 20 delimiting the through cavity 40 superiorly and this through cavity 40 is delimited by the inner wall 61 of the internal cavity 65 or by the upper rod 51.

Figure 11:
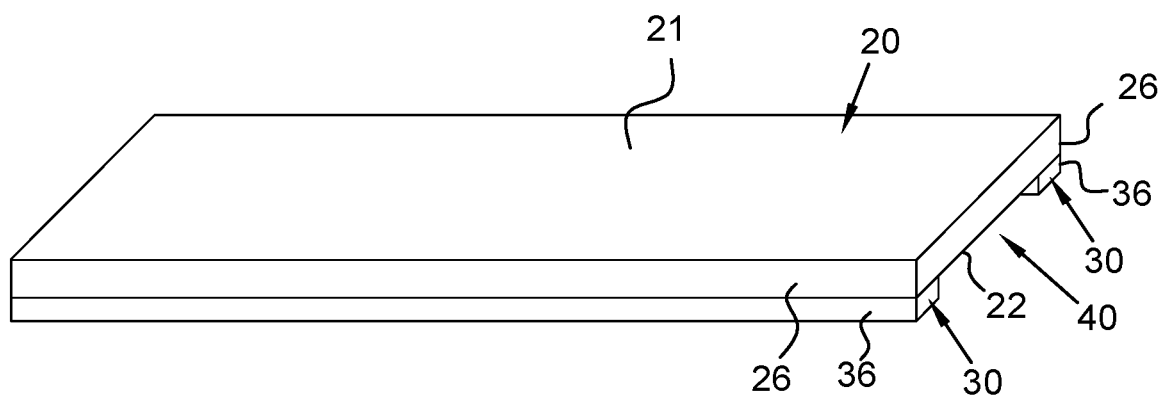
FIG. 11 is an axonometric view of an alternative element of an alternative basic module according to the present disclosure, where the concrete slab is separably mountable with a pair of concrete spacer bars arranged parallel to each other and at two transverse edges of the slab, where the pair of spacer bars support the slab being arranged under the lower face of the slab.

As shown in FIGS. 11-12 alternatively, it is possible to provide that pairs of spacer bars 30 can be made separately from the slab 20, that is as parts separably mountable with the concrete slab 20. The spacer bars 30 are made separately from the slabs 20 and simply arranged on the slab 20 during the step of stacking up a slab 20 on the other 20.

Alternatively, as shown in FIG. 12, each slab 20 of the couples of slabs 20 of the basic module 10 has transverse dimensions that are different from at least another slab 20 of the same couple of slabs 20 and/or of the same basic module 10 so that two transverse edges 26 of each slab 20 of the basic module 10 are in contact for at least one portion with curvilinear inner walls of the internal cavity 65 of the hollow tube 60. Moreover, the separable spacer bars 30 are arranged in such a way that at least one portion of their outer traverse wall 36 is in contact with at least one curvilinear portion of the inner wall 61 of the cavity 65 of the hollow tube 60 so as to follow even more accurately the curvilinear profile of the inner wall 61 of the cavity 65.

Alternatively, the hollow tube 60 may also be made of concrete.

Alternatively, the hollow concrete tube 60 may be one piece with the rods 50.

Alternatively, the hollow concrete tube 60 may be wrapped in a metal tube or metal sheet.

Alternatively, the slabs 20 can be made of solid material having good thermal capacity, thermal conductivity and resistance equivalent to concrete and with chemical-physical compatibility with the heat transfer fluid used.

Alternatively, the circular segment shaped rods 50 can be made of solid material having good thermal capacity, thermal conductivity and resistance equivalent to concrete and with chemical-physical compatibility with the heat transfer fluid used.

Alternatively it is possible to provide that spacer bars 30 of the basic module 10 can comprise a cross-section substantially in the rectangular shape, i.e. that the cross-section is square-shaped or that the cross-section is substantially rectangular in shape and has a lower geometric base and an upper geometric base parallel to each other so as to support the slabs 20 and that the lateral sides of the cross-section may have a curvilinear profile or other shape, for example a concave curvilinear profile, a convex curvilinear profile, an upward or downward tapered curvilinear profile.

As an alternative, as shown in FIG. 5, the thermal energy storage apparatus 100 comprising an alternative hollow tube 60 having a rectangular cross-section comprising an alternative internal cavity 65 having a rectangular cross-section.

According to this latter alternative and as shown in particular in FIGS. 3, 4, 5, the basic modules 10 provide for each slab 20 to have the same transverse dimension as any other slab 20 of the basic module 10.

As shown in particular in FIG. 5, the hollow tube 60 has a rectangular cross-section and the internal cavity 65 of the hollow tube 60 comprises a rectangular cross-section and has dimensions adapted to be completely occupied by the basic module 10, meaning that the transverse edges 26 of the slabs 20 are in contact with the inner walls of the cavity 65. Inside a hollow tube 60 it is possible to provide that there is a multiplicity of basic modules 10 arranged in series 70, as shown in FIG. 8 or 9.

Alternatively, as shown in FIGS. 3-5, 12, each spacer bar 30 of a pair of spacer bars 30 is equal to the other spacer bar 30 of the same pair of spacer bars 30.

Alternatively, the shape of the hollow tube 60 is different from the shape of the inner walls 61 of the hollow tube 60 which form the internal cavity 65 of the hollow tube 60.

Alternatively, the tube 60 has an elliptical cross-section. It is also possible to provide for the cross-section of the hollow tube 60 to be of a particular elliptical type where the major geometric axis is equal to the minor geometric axis and therefore the cross-section of the hollow tube 60 can have a circular shape.

Alternatively, it is possible to provide, as shown in FIG. 8, that the thermal energy storage apparatus 100 comprises a multiplicity of tanks, where each tank comprises the single series 70 of basic modules 10 arranged in series.

Alternatively, the thermal energy storage apparatus 100 also comprises a multiplicity of basic modules 10 arranged in parallel inside said internal cavity 65 of said at least one hollow tube 60.

The disclosure thus conceived is susceptible to many modifications and variants, all falling within the same inventive concept; furthermore, all details can be replaced by equivalent technical elements. In practice, the materials used, as well as the dimensions thereof, can be of any type according to the technical requirements.

The invention claimed is:

1. A thermal energy storage apparatus comprising
at least one hollow tube comprising an inner cavity and two ends, wherein each end provides a through opening, and
at least one basic module placed inside said inner cavity of said at least one hollow tube,
wherein said at least one basic module comprises at least one slab and at least one pair of spacer bars, at least one through channel adapted for the passage of a heat transfer fluid from one end to the other of said two ends of said at least one hollow tube,
wherein said pair of spacer bars are arranged parallel to each other and are arranged parallel with respect to a longitudinal axis passing along a longitudinal direction of said at least one hollow tube,
wherein at least one couple of slabs of said at least one slab are stacked up one on the other and each slab of said at least one couple of slabs comprises two faces, an upper face and a lower face, wherein each pair of spacer bars is placed between the upper face of a lower slab and the lower face of a higher slab of at least one couple of stacked up slabs, wherein each slab of said at least one couple of slabs comprises two transverse edges and each spacer bar of said at least one pair of spacer bars is placed at one of the two transverse edges of the slab so that said through channel comprises a transverse dimension which is as long as the maximum transverse dimension comprised between said walls of said pair of spacer bars.

2. The thermal energy storage apparatus according to claim 1, wherein at least one slab of said basic module is integral with at least said pair of spacer bars.

3. The thermal energy storage apparatus according to claim 1, wherein said at least one through channel is comprised between inner walls of each pair of spacer bars, an inner wall of said at least one slab and a support wall of another slab on which said at least one slab rests or of an inner wall of said cavity.

4. The thermal energy storage apparatus according to claim 1, wherein each slab of said at least one couple of slabs is made of concrete, and/or each spacer bar of said at least one pair of spacer bars is made of concrete.

5. The thermal energy storage apparatus according to claim 1, wherein each spacer bar of said at least one pair of spacer bars has a rectangular cross-section.

6. The thermal energy storage apparatus according to claim 1, wherein each spacer bar of each pair of spacer bars has a longitudinal dimension as long as a longitudinal dimension of the respective at least one slab.

7. The thermal energy storage apparatus according to claim 1, wherein each slab has the same transverse dimension as any other stacked up slab of said basic module.

8. The thermal energy storage apparatus according to claim 1, wherein said at least one hollow tube has a rectangular cross section and said internal cavity of said at least one hollow tube is rectangular and has dimensions adapted for being completely occupied by said at least one basic module.

9. The thermal energy storage apparatus according to claim 1, wherein said at least one hollow tube has an elliptical cross-section and said internal cavity of said at least one hollow tube is elliptical.

10. The thermal energy storage apparatus according to claim 9, wherein each slab of said at least one couple of slabs has transverse dimensions different with respect to at least another slab of said at least one couple of slabs so that two transverse edges of each slab of the basic module are in contact for at least a portion with curvilinear inner walls of said inner cavity of said at least one hollow tube.

11. The thermal energy storage apparatus according to claim 9, wherein said at least one basic module partially fits with said inner cavity of said at least one hollow tube thus generating at least one empty space between said at least one basic module and inner walls of said inner cavity, said empty space being occupied by a concrete rod having a circular segment shape cross-section.

12. The thermal energy storage apparatus according to claim 1, wherein it comprises a multiplicity of hollow tubes and a multiplicity of basic modules, wherein each basic module of said multiplicity of basic modules is placed inside each internal cavity of each hollow tube of said multiplicity of hollow tubes, wherein each hollow tube of said multiplicity of hollow tubes is arranged in series along a longitudinal axis with another hollow tube of said multiplicity of hollow tubes so that the ends of two adjacent hollow tubes of said multiplicity of hollow tubes arranged in series are in flow communication by means of heat transfer fluid distributors.

13. The thermal energy storage apparatus according to claim 1, wherein said internal cavity of said at least one hollow tube contains a multiplicity of basic modules arranged in series so that through channels of adjacent basic modules of said multiplicity of basic modules arranged in series are in flow communication by means of heat transfer fluid distributors.

14. The thermal energy storage apparatus according to claim 1, wherein each slab of said at least one couple of slabs comprises a longitudinal dimension of length ranging between 0.5 and 20 meters, a transversal dimension of length raging between 0.5 and 5 meters and a thickness of length ranging between 0.01 and 0.30 meters, wherein the thickness is measured along a vertical direction.

15. The thermal energy storage apparatus according to claim 1, wherein each spacer bar of said at least one pair of spacer bars has a thickness of length ranging between 0.005 and 0.05 meters, wherein the thickness is measured along a vertical direction, defining a vertical dimension of said through channel.

16. The thermal energy storage apparatus according to claim 1, wherein each spacer bar of said at least one pair of spacer bars has a transverse dimension of length ranging between 0.01 and 0.50 meters.

17. The thermal energy storage apparatus according to claim 1, wherein said hollow tube is made of metal.

18. The thermal energy storage apparatus according to claim 1, wherein said hollow tube is made of concrete or made of concrete wrapped in a metal tube or a metal sheet.

19. A process for manufacturing a thermal energy storage apparatus including the following steps:
a manufacturing phase of at least one basic module,
wherein said manufacturing step of said at least one basic module comprising at least one couple of slabs and at least one pair of spacer bars, includes
a step of stacking up in order at least one first slab of said at least one couple of slabs, said at least one pair of spacer bars and at least one second slab of said at least one couple of slabs so that said at least one first slab and said at least one second slab are stacked up one on the other and are spaced apart along a vertical direction by means of said at least one pair of spacer bars thus forming a through channel adapted for the passage of a heat transfer fluid from one end to the other of two ends of at least one hollow tube, wherein each of said through channel is comprised between inner walls of each pair of spacer bars and inner walls of each couple of stacked up slabs,
wherein said pair of spacer bars are arranged parallel to each other and are arranged parallel with respect to a longitudinal axis passing along a longitudinal direction of said at least one hollow tube,
wherein at least one couple of slabs are stacked up one on the other and each slab of said at least one couple of slabs comprises two faces, an upper face and a lower face, wherein each pair of spacer bars is placed between the upper face of a lower slab and the lower face of a higher slab of at least one couple of stacked up slabs, wherein each slab of said at least one couple of slabs comprises two transverse edges and each spacer bar of said at least one pair of spacer bars is placed at one of the two transverse edges of the slab so that said through channel comprises a transverse dimension which is as long as the maximum transverse dimension comprised between said walls of said pair of spacer bars.

20. The process for manufacturing a thermal energy storage apparatus according to claim 19, wherein the manufacturing step of said at least one basic module occurs inside a cavity of said hollow tube, wherein said at least one hollow tube comprises said internal cavity and said two ends, wherein each end comprises a through opening.

21. The process for manufacturing a thermal energy storage apparatus according to claim 19, wherein the process further includes a step for inserting said basic module inside an internal cavity of said at least a hollow tube,
wherein said at least one hollow tube comprises said internal cavity and said two ends, wherein each end comprises a through opening.

22. The process for manufacturing a thermal energy storage apparatus according to claim 19, wherein said thermal energy storage apparatus comprises at least one hollow tube including an inner cavity and two ends, wherein each end provides a through opening, at least one basic module placed inside said inner cavity of said at least one hollow tube, wherein said at least one basic module comprises at least one slab and at least one pair of spacer bars, at least one through channel adapted for the passage of a heat transfer fluid from one end to the other of said two ends of said at least one hollow tube.

* * * * *